(12) United States Patent
Thandiwe

(10) Patent No.: US 6,456,036 B1
(45) Date of Patent: Sep. 24, 2002

(54) BATTERY HAVING A NETWORK COMMUNICATION INTERFACE

(75) Inventor: Iilonga Pendapala Thandiwe, Atlanta, GA (US)

(73) Assignee: Motorola Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,223

(22) Filed: Sep. 29, 2000

(51) Int. Cl.[7] ................................................ H02J 7/00
(52) U.S. Cl. ...................................................... 320/106
(58) Field of Search .................................. 320/106, 112, 320/132, 150, 162, 165, DIG. 12

(56) References Cited

U.S. PATENT DOCUMENTS

| | | | |
|---|---|---|---|
| 5,974,552 A | * 12/1996 | Lim et al. | 713/300 |
| 5,929,601 A | * 12/1997 | Kaib et al. | 320/113 |
| 6,031,354 A | * 12/1997 | Wiley et al. | 320/116 |
| 5,982,147 A | * 1/1998 | Anderson | 320/132 |
| 6,078,871 A | * 1/1998 | Anderson | 702/63 |
| 5,932,989 A | * 5/1998 | Thandiwe et al. | 320/106 |

* cited by examiner

Primary Examiner—Gregory J. Toatley, Jr.
Assistant Examiner—Pia Tibbits
(74) Attorney, Agent, or Firm—Philip H. Burrus, IV

(57) ABSTRACT

A smart battery that has a network communication interface such that the battery can send and receive battery-related data. The battery is in conductive and communicative interface with a device, such as a cellular telephone, personal digital assistant (PDA), or laptop computer, which has a network communication pathway that the battery uses for data exchange. The smart battery can alternately be in conductive and communicative interface with a charger that is interfaced with a computer, and the charger selectively establishes a network communication pathway through the charger-computer interface for the smart battery to exchange data across the network. The smart battery preferably exchanges data with a manufacturer web site across the Internet.

7 Claims, 2 Drawing Sheets

BATTERY HAVING A NETWORK COMMUNICATION INTERFACE

TECHNICAL FIELD

The present invention generally relates to electrochemical batteries that include microprocessors. More particularly, the present invention relates to batteries including a computer system that allows the battery to communicate battery-related information across a network.

BACKGROUND OF THE INVENTION

There are electrochemical batteries that are typically rechargeable nickel-cadmium or lithium-ion based and which include microprocessors or microcontrollers as a component, and consequently are often referred to as "smart" or "intelligent" batteries. The smart batteries however only communicate data in an electronic format to other devices in the native system, such as a cellular telephone, that the battery powers, and the data only travels across the communication bus or other hardwired data line to the internal devices of the native system. Smart batteries therefore do not typically communicate with any external devices not hardwired with the native system.

In designing and improving batteries, it is desirous to gather as much operational data about battery performance during customer usage. In essence, learning about how the battery is used and abused by the customer, and how the battery fails are essential elements in producing optimal and effective product designs. Although, with existing smart batteries, once the battery is shipped from the manufacturer, there is no ability to accurately gather data from the battery. Consequently, the manufacturer can only estimate the performance of the battery based upon internal testing and assumptions about consumer usage, and these estimates can be greatly in error. The estimated life of a battery is especially erroneous for those consumers who use the battery in much more strenuous manner than the manufacturer might anticipate.

The inability for the manufacturer to gather data about the battery is also a disadvantage to the consumer. Both the manufacturer and the consumer have no way to determine the condition of the battery while in use by the consumer. Without the data on the condition of the battery, one is not able to predict imminent failure or detect marginal operation of the battery. Moreover, without an avenue of communication from the manufacturer to the battery, the manufacturer has no way to provide the battery with remote software updates, enhancements, or bug-fixes without physically returning the battery to the manufacturer for modification.

Accordingly, existing intelligent batteries lack the ability to communicate important data about the condition of the battery which prevents the user from accurately knowing the condition of the battery. Moreover, valuable operational data about batteries operating in the marketplace is never captured. It is thus to the provision of such an intelligent battery having a communication interface that can communicate battery-related data to other devices across a network, such as the Internet, that the present invention is primarily directed.

DETAILED DESCRIPTION OF THE INVENTION

Figure 1:
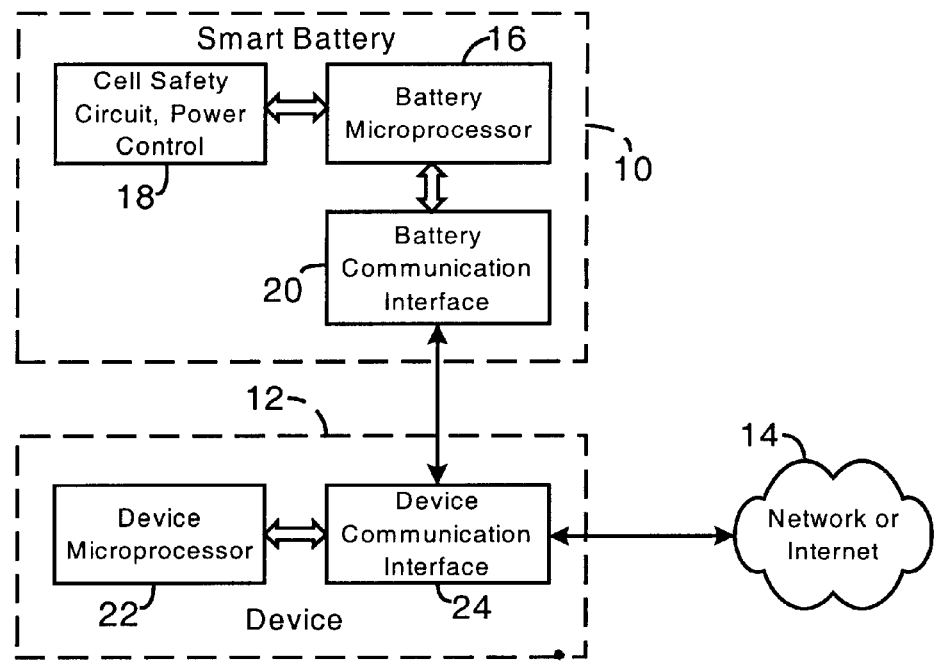
FIG. 1 is a block diagram illustrating the smart battery of the present invention installed on a stand-alone communication device such as a cellular telephone, PDA, or a laptop computer.

With reference to the figures in which like numerals represent like elements throughout, FIG. 1 illustrates a smart battery 10 installed in a device 12, where the device is connected to a network 14, such as the Internet. The device 14 can be connected to the network 14 through either a hard line or a wireless connection. In FIG. 1, the device is preferably a cellular telephone, a personal digital assistant (PDA), or a laptop computer, and each of which has a network 14 connection. The smart battery 10 is in conductive and communicative interface with the device 12, e.g. the smart battery 10 is plugged into a slot on a cellular telephone such that the battery 10 can provide power to the components of the cellular telephone, and the battery 10 can communicate with the device communication interface 24. The smart battery 10 includes a battery microprocessor, such as Motorola 68000, ASIC, or other microcontroller as known in the art, that controls the activities of the battery, such as the cell safety circuit and power control 18, and the inventive battery communication interface 20. As used herein, the term "microprocessor" can be any microprocessor, microcontroller, ASIC, state device, sequential circuit, and equivalents thereof as are known in the art.

Figure 2:
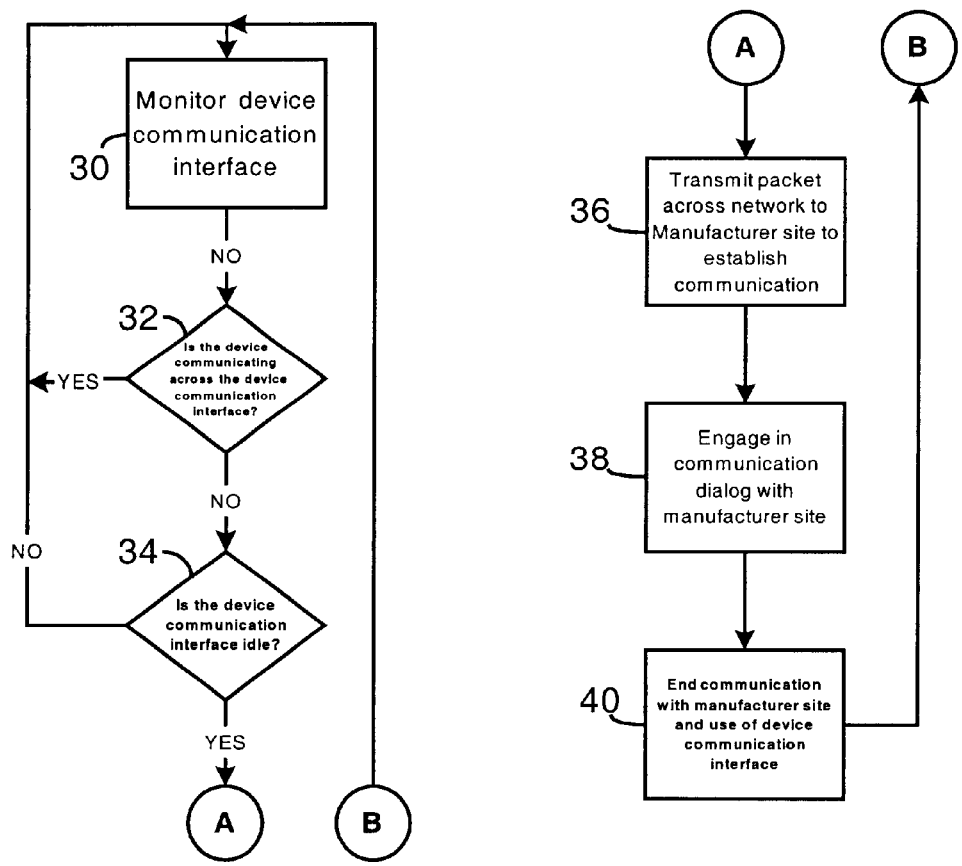
FIG. 2 is a flowchart illustrating the preferred algorithm that the smart battery executes in attempting to communicate with a manufacturer Internet site.

The battery microprocessor 16 will execute a program (which is illustrated in FIG. 2) that selectively uses the battery communication interface 20 to monitor the device communication interface 24 to communicate across the network 14 to preferably a manufacturer web site and exchange data therewith. The battery communication interface 20 is preferably a full-duplex, i.e. two-way, link to at least the device 12, between the battery microprocessor 16 and the device microprocessor 22, although a half duplex or other data connection can alternately be used. At the direction of the battery microprocessor 16, the battery communication interface 20 selectively seizes the network connection of the device communication interface 24, establishes a network communication pathway for the battery microprocessor 16, and permits data exchange across the pathway.

The device includes a device microprocessor 22 that is in communication with and typically controls a device communication interface 24. The device communication interface 24 allows the device microprocessor 22 to exchange data with other devices, such as battery 10, and the devices across the network 14. The device communication interface 24 typically has an existing network communication pathway, such as a wireless data link, that can be accessed by the device microprocessor 22, or another microprocessor such as battery microprocessor 16.

In an alternate embodiment, the battery microprocessor 16 can store battery related data on the device microprocessor 22 such that the battery microprocessor 16 can trigger the transmission of the battery-related data to a manufacturer website across the network 14. The device microprocessor 22 can be used as an information node, and likewise receive information from the manufacturer or other website and relay the information, such as data, software patches or alerts, to the battery microprocessor 16 when so prompted by the battery microprocessor 16. Thus, in such embodiment, the device processor 22 is monitoring the device communication interface 24 and allowing the data to be transmitted upon availability of the device communication interface 24.

In FIG. 2, the process by which the battery microprocessor 16 (preferably through the battery communication interface 20) monitors the device communication interface 24. The battery microprocessor 16 monitors the network communication pathway at the device communication interface, as shown at step 30, and determines if the device 12 is communicating across the device communication interface 24, as shown at decision 32. Such communication can be either across the network 14 or other devices. Consequently, the battery microprocessor 16 is monitoring the device communication interface to determine if a network communication pathway is present such that the battery microprocessor 16 can utilize the device communication interface 24 to transmit data to the network 14. If there is communication on the device communication interface 24, the battery microprocessor 16 returns to a monitoring state (step 30) to again monitor the device communication interface 24.

If there is no communication across the device communication interface 24, then a determination is made as to whether the device communication interface 24 is idle, as shown at decision 34. This second monitoring of the idleness of the device communication pathway is in essence to make sure that pathway is available for communication from the battery 10. If the device communication interface 24 is not idle, then the battery microprocessor 16 returns to a monitoring state (step 30). Upon the absence of device communication and presence of communication pathway idleness, the battery microprocessor 16 transmits data packets across the network to establish communication with a site, preferably a manufacturer site, or otherwise communicates across the network 14 to a site on the network, as shown at step 36. The battery microprocessor 16 then preferably engages in a communication dialog with the manufacturer or other site, as shown at step 38, as the battery microprocessor 16 both sends and receives data across the network though the battery communication interface 20 and seized device communication interface 24. The battery microprocessor 16 then ends the communication dialog with the manufacturer or other site, as shown at step 40, and ceases to communicate across the device communication interface 24 and returns to a monitoring wait state (step 30) and begins the communication process once further communication by the battery 10 is necessary.

The battery microprocessor 16 preferably periodically monitors the device communication interface 24 and makes the network connection whenever possible such that the accumulated data of the battery 10 can be sent to the manufacturer site and the manufacturer site can send data to the battery 10 if necessary. When battery microprocessor 16 connects to the manufacturer's web site, it preferably downloads the battery serial number for identification purposes, and then transmits the other battery related data. Once the manufacturer site identifies the battery, it can upload useful information into the battery if necessary, such as software updates or bug-fixes. The manufacturer site can also transmit notification information that can be received at the device for display to the user of the device. Examples of notifications are: "your battery is near end of life"; "your usage pattern suggests that a X100 battery might be a more cost effective battery for your system", or "there appears to be a fault in your charger; Please see your service representative."

Figure 3:
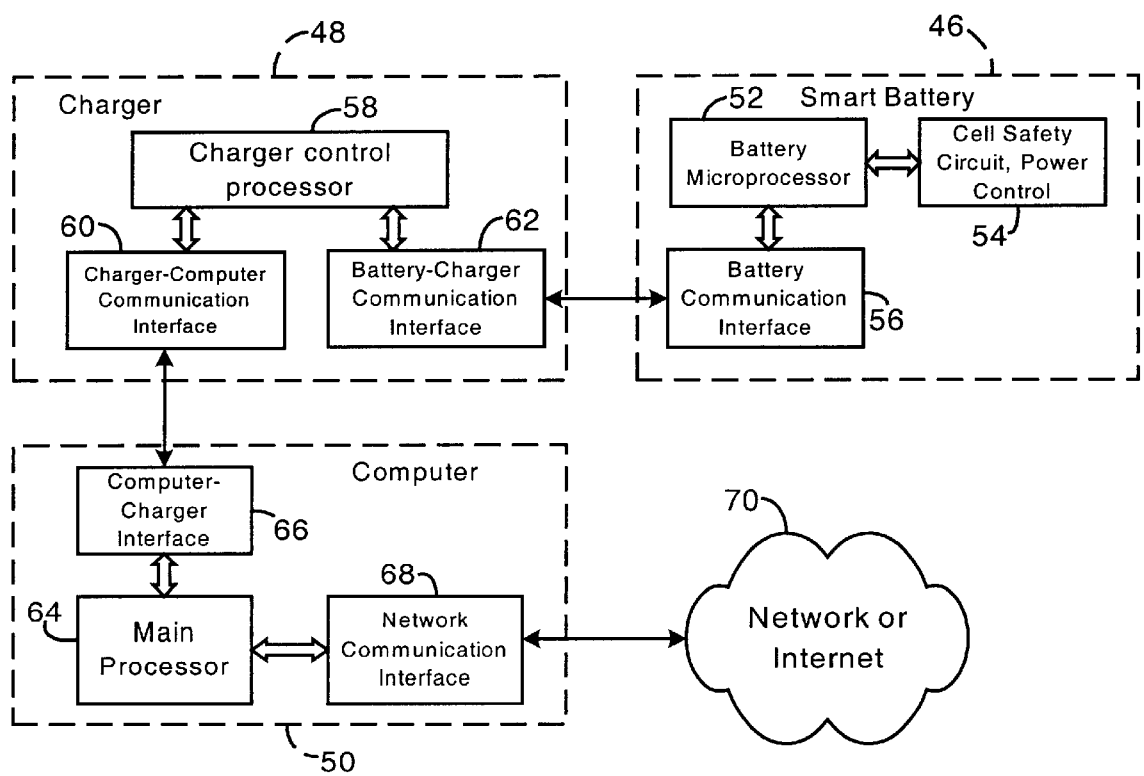
FIG. 3 is a block diagram of a smart battery in place in a charger that is in communication with a computer having a network communication interface.

With reference to FIG. 3, there is shown an alternate embodiment of the smart battery 46 battery in interface with a charger 48, and the charger 48 is interfaced with a computer 50 that has a network communication pathway to the network or internet 70. The smart battery 46 is similar to the smart battery 10 of FIG. 1, in that smart battery 46 has a cell safety circuit and power control 54 and battery communication interface 56, with a battery microprocessor 52 in control of all functions. While this embodiment essentially functions in same manner as the battery 10-device 12 combination in FIG. 1, here, the battery communication interface 56 communicates with the battery-charger communication interface 62 instead of the computer-charger interface 66, which is similar to the device communication interface 24 of FIG. 1. Thus, the charger 48 is a communication layer in between the battery 46, computer 50, and network 70.

The charger 48 includes a charger control processor 58 that control all functions of the charger 48, and specifically a charger-computer communication interface 60 and a battery charger communication interface 62. The charger-computer communication interface 60 and battery-charger communication interface 62 can be an identical component, i.e. a single charger communication interface; however, they are shown here as separate components for ease of illustration. The charger control processor 58 thus controls communication between the charger 48 and battery 46, and the charger 48 and computer 50, allowing either data packet transmission, as would be present in network communications, or direct synchronous or asynchronous data streaming. In such embodiment, the charger 48 also can create whatever data link is necessary for the battery microprocessor 52 to reach the network 70, such as a data carrier frequency, RF link, and the like. There can alternately be a hardwired interface between the charger 48 and computer 50 to create a physical interface link, such as serial port, USB, or expansion card slot.

The charger control processor 58 can alternately be an information node in a manner similar to the device microprocessor 22 to send information from the battery microprocessor 52 to the network 70 and manufacturer or other web site. Thus, the battery-related information would be stored at the charger control processor 58 for transmission therefrom when the network communication interface 68 is available for transmission of the data. Thus, the charger control processor 58 will emulate the monitoring steps of the battery microprocessor 16 in FIG. 2 in order to allow data to travel from and to the battery microprocessor 52.

The computer 50 can be any computer as is known in the art, with the relevant components shown here: the main processor 64 that controls a computer-charger interface 66 and a network communication interface 68. As with charger 48, the computer-charger interface 66 and network communication interface 68 can be the same communication component or interface, and are shown separate here for ease of illustration. Moreover, the charger-computer communication interface 60 can directly communicate with the network communication interface 68 of the computer 50 has one communication interface, such as a communication bus.

In operation, the battery microprocessor 52 of the smart battery 46 can monitor the network communication interface 68 through several avenues. The charger-control processor 58 can gather information about the network communication interface 68 from the computer 50 and transmit or otherwise make the information accessible to the battery microprocessor 52. In such case, the charger-control processor can then pass information to and from the battery microprocessor 52 when the network communication interface 68 is available for communication to the network 70. Otherwise the battery communication interface 56 can use the charger 48 as a data conduit to the computer 50 and can monitor the network communication interface 68 directly, in the same manner as the battery communication interface 20 monitors the device communication interface 24 in FIG. 1. In either embodiment, the battery microprocessor 52 of smart battery 46 monitors, directly or indirectly, the network communication interface 68 with the process as disclosed in FIG. 2.

The smart battery 10 or 46 preferably collects and retains critical battery operational information about the battery which can be relayed to the manufacturer web site. Example of monitored parameters are: (1) changes in the full charge capacity with use; (2) the average charge/discharge intervals and profiles, and typical depth (i.e., capacity) of discharge; (3) typical discharge currents and profiles; (4) typical operating times and charge times; and (5) amount of time in inactive ("sleep") mode versus operational mode. Other parameters in specific regard to consumer usage can also be monitored, and data relative thereto sent to the manufacturer. Examples of these parameters include: (1) continuous or momentary operation near, at, or beyond temperature limits; (2) number of times and duration of exceeding charge/discharge current limits; (3) excessively high number of communications faults; (4) repeated activation of primary over-voltage (may suggest a problem with the charger); and (5) frequent recording of short circuit condition Further, the communication that is possible between the smart battery 10, 46 and the manufacturer web site gives additional functionality to the smart battery. Specifically, the battery software resident on the battery microprocessor 16, 52 to be changed, updated, and corrected without having to physically remove or change the battery. Additionally, the manufacturer can monitor the condition of the battery 10,46 and notify the user of impending battery end-of-life or other catastrophic failure of the battery.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A battery having a network communication interface, the battery being in conductive and communicative interface with a device having a device microprocessor that includes a network communication pathway, the battery comprising:

a battery microprocessor controlling the functions of the battery; and a battery communication interface in communication with the battery microprocessor and selective communication with the device microprocessor, the battery communication interface selectively communicating across the network communication pathway of the device microprocessor.

2. The battery of claim 1, wherein the battery microprocessor monitors the communication pathway for device communication present upon the device communication pathway and idleness of the device communication pathway, and upon the absence of device communication and presence of communication pathway idleness, the battery microprocessor communicating across the network to a site on the network.

3. The battery of claim 2, wherein the network is the Internet.

4. The battery of claim 1, wherein the battery is interfaced with a charger, and the charger is interfaced with a computer having the network communication pathway.

5. A battery having a network communication interface, the battery being in conductive and communicative interface with a device having a device microprocessor that includes a network communication pathway, the battery comprising:

a battery microprocessor controlling the functions of the battery; and a battery communication interface in communication with the battery microprocessor and selective communication with the device microprocessor, the battery communication interface selectively communicating and storing the battery-related data at the device microprocessor, and the device microprocessor selectively transmitting the battery-related data across the network communication pathway and receiving data from the network communication pathway for transmission to the battery microprocessor.

6. The battery of claim 5, wherein the battery is interfaced with a charger, and the charger is interfaced with a computer having the network communication pathway, and the device processor is a charger control processor storing the battery-related data and selectively transmitting the battery-related data across the network communication pathway and receiving data from the network communication pathway for transmission to the battery microprocessor.

7. The battery of claim 5, wherein the device microprocessor selectively communicating across the network communication pathway to a manufacturer website and transmits battery-related data.

\* \* \* \* \*